US009100652B2

(12) United States Patent
Dzik et al.

(10) Patent No.: US 9,100,652 B2
(45) Date of Patent: Aug. 4, 2015

(54) PERFORMANCE CONTROL IN VIDEO ENCODING

(71) Applicant: LSI Corporation, Milpitas, CA (US)

(72) Inventors: Dariusz Dzik, Allentown, PA (US); George Kustka, Marlboro Township, NJ (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 375 days.

(21) Appl. No.: 13/716,433

(22) Filed: Dec. 17, 2012

(65) Prior Publication Data

US 2014/0169457 A1    Jun. 19, 2014

(51) Int. Cl.
| | |
|---|---|
| *H04N 19/00* | (2014.01) |
| *H04N 19/194* | (2014.01) |
| *H04N 19/172* | (2014.01) |
| *H04N 19/12* | (2014.01) |
| *H04N 19/156* | (2014.01) |
| *H04N 19/122* | (2014.01) |
| *H04N 19/103* | (2014.01) |
| *H04N 19/117* | (2014.01) |

(52) U.S. Cl.
CPC ............ *H04N 19/194* (2014.11); *H04N 19/12* (2014.11); *H04N 19/156* (2014.11); *H04N 19/172* (2014.11); *H04N 19/103* (2014.11); *H04N 19/117* (2014.11); *H04N 19/122* (2014.11)

(58) Field of Classification Search
CPC .................................................... H04N 19/156
USPC ..................................................... 375/240.02
See application file for complete search history.

(56) References Cited

U.S. PATENT DOCUMENTS

| | | | |
|---|---|---|---|
| 8,077,769 B2 | 12/2011 | Krishnan ...................... 375/240 |
| 8,238,424 B2 | 8/2012 | Chang et al. .............. 375/240.06 |
| 2007/0104272 A1 | 5/2007 | He et al. ................... 375/240.12 |
| 2008/0084491 A1 | 4/2008 | He et al. ................... 348/333.13 |
| 2009/0304085 A1* | 12/2009 | Avadhanam et al. ..... 375/240.24 |
| 2010/0195733 A1 | 8/2010 | Yan et al. .................. 375/240.16 |

* cited by examiner

*Primary Examiner* — Sath V Perungavoor
*Assistant Examiner* — Jeffery Williams (57) ABSTRACT

An apparatus having a circuit is disclosed. The circuit may be configured to (i) generate a complexity value by encoding a current picture in a video signal, where the current picture is encoded using a current one of a plurality of configurations, (ii) calculate an estimate in response to the complexity value and (iii) reconfigure the encoding into a new one of the configurations in response to the estimate relative to one or more thresholds. The configurations may include a normal configuration and one or more simplified configurations. The estimate generally describes a computational stress that the encoding of the current picture placed on the circuit. The new configuration may be different from the current configuration.

16 Claims, 7 Drawing Sheets

PERFORMANCE CONTROL IN VIDEO ENCODING

CROSS REFERENCE TO RELATED APPLICATIONS

The present application is related to co-pending U.S. application Ser. No. 13/692,118, filed Dec. 3, 2012, which is incorporated by reference.

FIELD OF THE INVENTION

The present invention relates to video encoding generally and, more particularly, to a method and/or apparatus for implementing performance control in video encoding.

BACKGROUND OF THE INVENTION

An H.264 Advanced Video Coder (i.e., H.264) standard has introduced state-of-the-art and high compression efficiency coding techniques. High coding performance is made possible by implementing many tools, such as flexible block sizes, motion compensation, sub-pixel level motion compensation, bidirectional motion estimation, de-blocking filtering, flexible transforms and efficient entropy coding. The tools have created a greater demand for processor computational power during the video coding.

The processor computational power consumed while encoding average or steady state content is not always sufficient to handle stressful and complex content, such as high motion video or change of video scenery. However, designing a processor system to handle worst case scenarios is not economical or even possible due to high variability of the video content and limitations of the processor technology. The complex video content is addressed in conventional approaches by skipping the processing for some frames, reducing the frame rate and implementing region-of-interest coding techniques.

It would be desirable to implement performance control in video encoding.

SUMMARY OF THE INVENTION

The present invention concerns an apparatus having a circuit. The circuit may be configured to (i) generate a complexity value by encoding a current picture in a video signal, where the current picture is encoded using a current one of a plurality of configurations, (ii) calculate an estimate in response to the complexity value and (iii) reconfigure the encoding into a new one of the configurations in response to the estimate relative to one or more thresholds. The configurations may include a normal configuration and one or more simplified configurations. The estimate generally describes a computational stress that the encoding of the current picture placed on the circuit. The new configuration may be different from the current configuration.

The objects, features and advantages of the present invention include providing performance control in video encoding that may (i) change a video encoding configuration on-the-fly, (ii) change the encoding configuration based on a stress model, (iii) evaluate complexity of pictures being encoded, (iv) reduce picture encoding efficiency to maintain computational power below a defined level and/or (v) implement an H.264 codec.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention may adjust an encoder configuration based on a stress model of video content. A complexity of the video content may be evaluated, a stress level estimated and the encoder configuration may be adjusted accordingly to minimize the consumed computational resources and/or power. Higher complexity content may be encoded at lower quality to help maintain a constant encode rate (e.g., 30 frames per second). Specific changes to the encoding configuration may be based on encoding parameters that minimize degradation to a visually perceived quality, minimize computational resources used by encoding operations, minimize computational resources used by the decoding operations and/or speed up the decoding operations.

Figure 1:
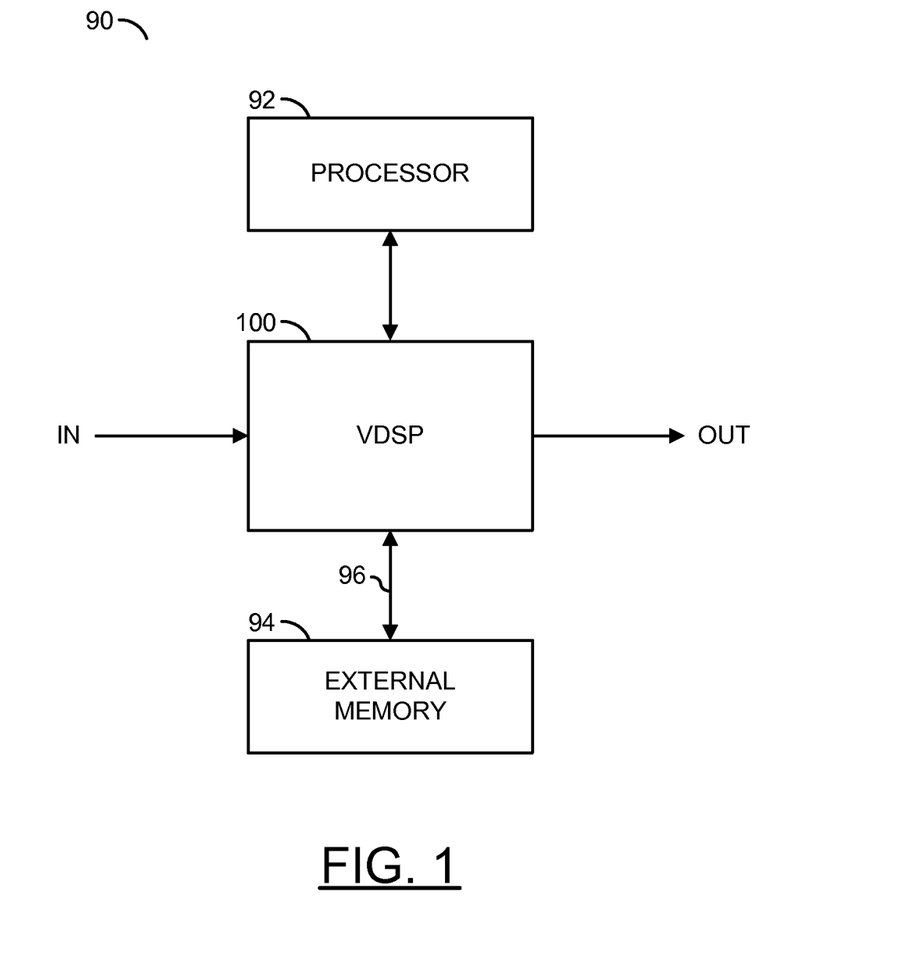
FIG. 1 is a block diagram of an example implementation of an apparatus.

Referring to FIG. 1, a block diagram of an example implementation of an apparatus 90 is shown. The apparatus (or circuit or device or integrated circuit) 90 may implement a video encoder. The apparatus 90 generally comprises a block (or circuit) 92, a block (or circuit) 94, a bus (or circuit) 96 and a block (or circuit) 100. The circuits 92-100 may represent modules and/or blocks that may be implemented as hardware, software, a combination of hardware and software, or other implementations.

The circuit 100 may be directly coupled with the circuit 92 to exchange data and control information. The circuit 100 may be coupled with the circuit 94 to exchange data. An input signal (e.g., IN) may be received by the circuit 100. An output bitstream signal (e.g., OUT) may be presented by the circuit 100.

The signal IN may be one or more analog video signals and/or one or more digital video signals. The signal IN generally comprises a sequence of progressive-format frames and/or interlace-format fields. The signal IN may include synchronization signals suitable for synchronizing the video information. The signal IN may be presented in analog forms such as, but not limited to, an RGB (Red, Green, Blue) signal, an EIA-770 (e.g., YCrCb) signal, an S-video signal and/or a Composite Video Baseband Signal (CVBS). In digital form, the signal IN may be presented as, but is not limited to, a High Definition Multimedia Interface (HDMI) signal, a Digital Video Interface (DVI) signal and/or a BT.656 signal. The signal IN may be formatted as a standard definition signal or a high definition signal.

The signal OUT may be a compressed and encoded digital video signal, generally referred to as a bitstream. The signal OUT may comprise a sequence of progressive-format frames and/or interlace-format fields. The signal OUT may be compliant with a VC-1, MPEG and/or H.26x standard. The MPEG/H.26x standards generally include H.263, H.264, MPEG-1 MPEG-2 and MPEG-4. The MPEG standards may be defined by the Moving Pictures Expert Group, International Organization for Standards, Geneva, Switzerland. The H.26x standards may be defined by the International Telecommunication Union-Telecommunication Standardization Sector, Geneva, Switzerland. The VC-1 standard may be defined by the document Society of Motion Picture and Television Engineer (SMPTE) 421M-2006, by the SMPTE, White Plains, N.Y.

The circuit 92 may be implemented as a processor. The circuit 92 may be operational to perform select digital video encoding operations. The encoding may be compatible with the VC-1, MPEG or H.26x standards. The circuit 92 may also be operational to control the circuit 100. In some embodiments, the circuit 92 may implement a SPARC processor. In other embodiments, the circuit 92 may implement an ARM processor. Other types of processors may be implemented to meet the criteria of a particular application. The circuit 92 may be fabricated as an integrated circuit in (on) a single chip (or die).

The circuit 94 may be implemented as a dynamic random access memory (e.g., DRAM). The circuit 94 may be operational to store or buffer large amounts of information consumed and generated by the encoding operations of the apparatus 90. As such, the circuit 94 may be referred to as a main (or external) memory. The circuit 94 may be implemented as a double data rate (e.g., DDR) memory. Other memory technologies may be implemented to meet the criteria of a particular application. The circuit 94 may be fabricated as an integrated circuit on a single chip (or die). In some embodiments, the circuits 92 and 94 may be fabricated in (on) separate chips.

The circuit 96 may implement a memory bus. The bus 96 is generally operational to carry data, addresses and commands between the circuit 100 and the circuit 94. The bus 96 generally includes a data bus having a width of multiple bits (e.g., 128 bits).

The circuit 100 may be implemented as a video digital signal processor (e.g., VDSP) circuit. The circuit 100 may be operational to perform additional digital video encoding operations. The circuit 100 may be controlled by the circuit 92. The circuit 100 generally comprises multiple digital signal processors (or cores). Encoding operations performed by the circuit 100 may include, but are not limited to, the following. The circuit 100 may generate a complexity value by encoding a current picture in the signal IN. The current picture may be encoded using a current encoder configuration among several configurations. The configurations may include, but are not limited to, a normal configuration and one or more simplified configurations. The circuit 100 may also calculate a stress estimate in response to the complexity value. The stress estimate generally describes a computational stress that the encoding of the current picture placed on the apparatus 90 (e.g., the circuit 100). The circuit 100 may reconfigure the encoding operation into a new configuration in response to how the stress estimate aligns relative to one or more stress thresholds. The new configuration is generally different from the current configuration. In some situations where the stress estimate exceeds a stress threshold, the new configuration may change the encoding parameters to decrease an encoding stress of the circuit 100 relative to the current (or old) configuration. In other situations where the stress estimate falls below a stress threshold, the new configuration may change the encoding parameters to increase the encoding stress of the circuit 100 relative to the current configuration. The circuit 100 may be fabricated as an integrated circuit on a single chip (or die). In some embodiments, the circuits 92 and 100 may be fabricated in (on) the same chip. In other embodiments, the circuits 92 and 100 may be fabricated in (on) separate chips.

Figure 2:
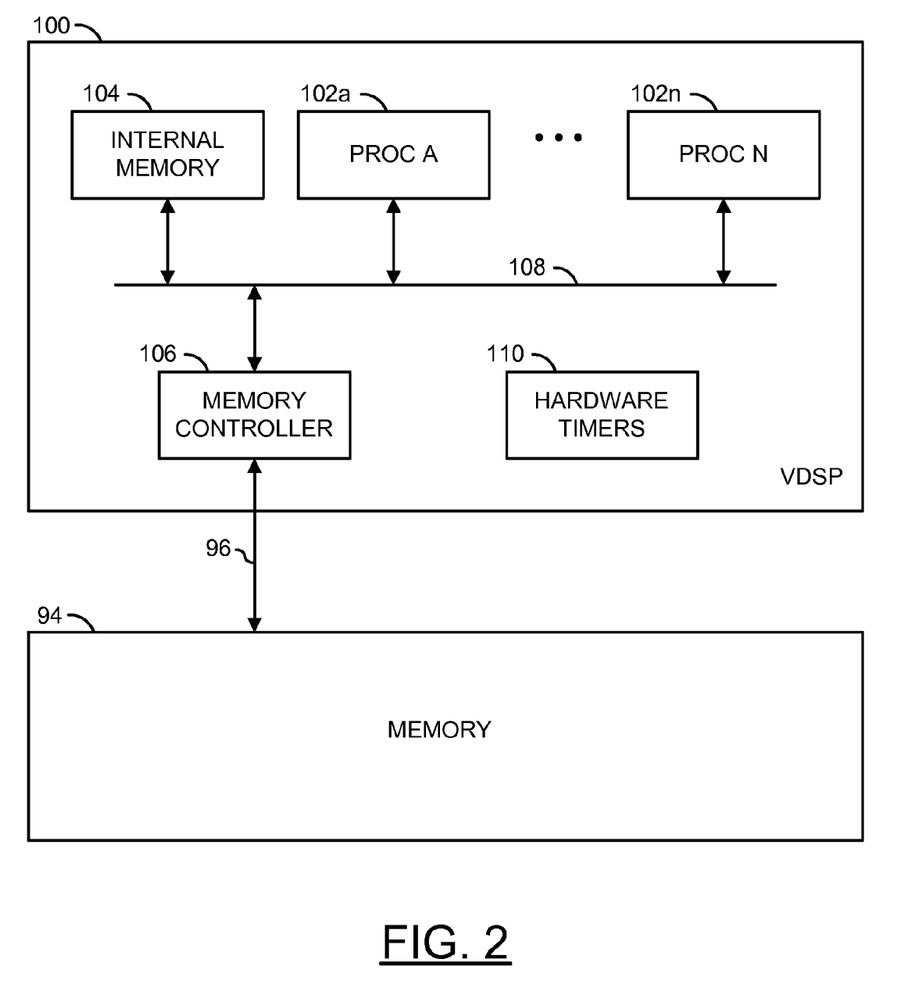
FIG. 2 is a detailed block diagram of the apparatus in accordance with a preferred embodiment of the present invention.

Referring to FIG. 2, a detailed block diagram of the apparatus 90 in accordance with a preferred embodiment of the present invention is shown. The circuit 100 generally comprises multiple blocks (or circuits) 102a-102n, a block (or circuit) 104, a block (or circuit) 106, a bus (or circuit) 108 and a block (or circuit) 110. The circuits 102a-110 may represent modules and/or blocks that may be implemented as hardware, software, a combination of hardware and software, or other implementations.

The circuit 106 may be bidirectionally coupled to the circuit 108 via the bus 96. The circuits 102a-102n may be bidirectionally coupled to the circuit 106 via the bus 108. The circuit 104 may be bidirectionally coupled to the circuits 106 and 102a-102n via the bus 108.

Each circuit 102a-102n may implement a core processor circuit. The circuits 102a-102n are generally operational to execute a plurality of program instructions (e.g., software programs). The programs may include, but are not limited to, a compression process, an entropy encoding process and a decompression process. The compression process may include, but is not limited to, a control process, a motion estimation process, a motion compensation process, an intra-prediction process, a forward transform process, a quantization process, a complexity computational process and a slice partitioning process. The decompression process may include, but is not limited to, an inverse quantization process, an inverse transform process and a filter process.

The circuit 104 may implement an internal memory circuit. The circuit 104 may be operational to store reference samples and the current block samples used in the motion compensations. The circuit 104 may be utilized by the circuits 102a-102n as a local storage for rapid access to the reference samples and the current block samples.

The circuit 106 may implement a memory controller circuit. The circuit 106 is generally operational to control access of the circuit 94 by the circuits 102a-102n and/or the circuit 92.

The circuit 108 may implement an internal bus. The bus 106 may be operational to transfer data, samples, commands and other information between the circuits 102a-102n, 104 and 106.

The circuit 110 may implement a hardware timer circuit. The circuit 110 is generally operational to provide multiple hardware timers controlled by the circuits 102a-102n. The circuit 110 may be used to determine a complexity of a picture being encoded by measuring the amount of time used to encode. Other operations may be timed to meet the criteria of a particular application.

Figure 3A:
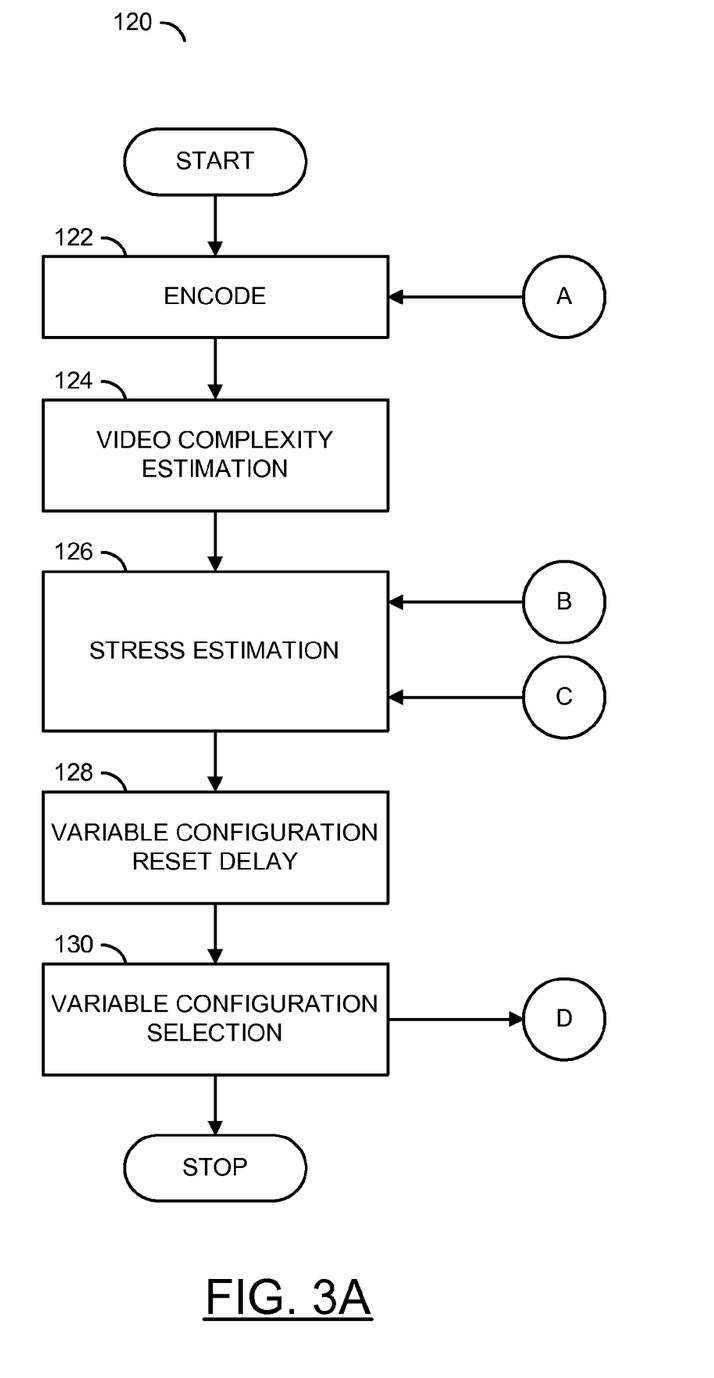
FIGS. 3A-3B are a flow diagram of an example implementation of a method for performance control in video encoding.
Figure 3B:
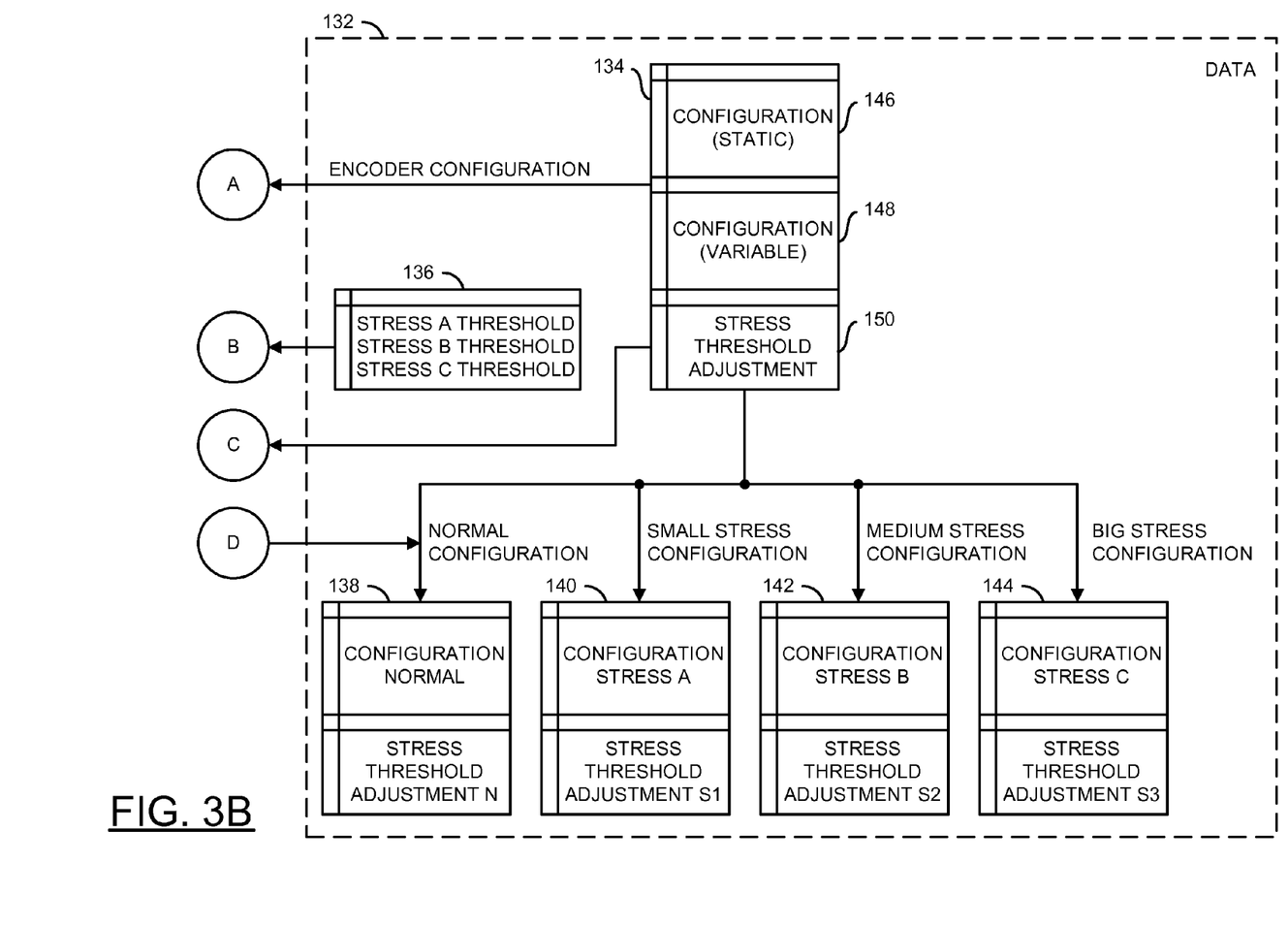

Referring to FIGS. 3A-3B, a flow diagram of an example implementation of a method 120 for performance control in video encoding is shown. The method (or process) 120 may be implemented by the apparatus 90. The method 120 generally comprises a step (or state) 122, a step (or state) 124, a step (or state) 126, a step (or state) 128 and a step (or state) 130. The steps 122-130 may represent modules and/or blocks that may be implemented as hardware, software, a combination of hardware and software, or other implementations.

The method 120 may also utilize data (or information) 132. The data 132 generally comprises configuration data 134, stress threshold data 136, a normal configuration data 138 and data for one or more stress configurations 140-144. The stress configuration A data 140 generally provides encoding parameters that simplify the encoding operation compared with the normal configuration data 138. The stress configuration B data 142 generally provides encoding parameters that simplify the encoding operation compared with the stress configuration A data 140. The stress configuration C data 144 generally provides encoding parameters that simplify the encoding operation compared with the stress configuration B data 142. Simplifying the encoding may reduce the stress imparted on the circuit 100. The configuration data 134 may comprise normal (or static) configuration data 146, variable (or dynamic) configuration data 148 and a current stress threshold adjustment data 150.

In the step 122, the apparatus 90 may use the current static configuration data 146 and the current variable configuration data 148 to perform encoding operations. The encoder static configuration data 146 is generally provided by a user to meet specific criteria of an application.

In the step 124, the apparatus 90 (e.g., the circuits 92 and 100) generally calculates a video content complexity estimation based on computational complexity statistics and/or the processor hardware timers of the circuit 110. The computational complexity statistics (or workloads) may be calculated from one or more previously coded pictures. Historical trends may be analyzed to determine when the video content is changing from lower complexity content (and thus low stress) to higher complexity content (and thus high stress), and vice-versa. Furthermore, timeouts may act as triggers to check if the content complexity has returned to normal.

The statistics may be a collection of characteristics of the pictures, the encoding techniques actually used in the encoding operations and/or results of the encoding operations. The characteristics generally comprise the number of macroblock rows in each frame or field. The techniques may include, but are not limited to, encoding the previous pictures using intra macroblocks, inter macroblocks, skipped macroblocks, sub-pixel resolution motion estimations, intra 8×8, 8×16 or 16×8 motion estimations, 4×4 discrete cosine transformations and 8×8 discrete cosine transformations. The results generally comprise the number of bits created by the encoder. The video content complexity estimation may be expressed as a percent of a total available processor computational power or expressed in processing cycles. Additional details for calculating the complexity may be found in co-pending U.S. application Ser. No. 13/692,118, which is hereby incorporated by reference in its entirety.

In the step 126, the apparatus 90 may use the predefined stress threshold data 136 with the current stress level threshold adjustment variable 150 to determine a magnitude of a maximum-allowed stress for the circuit 100 (e.g., subtract the stress level threshold value from the predefined stress threshold value). If the stress obtained in the step 124 is below the smallest maximum-allowed stress threshold, the variable configuration data 148 should be changed to the normal configuration 138 to improve the quality. As the stress level moves above the maximum-allowed stress threshold, the variable configuration data 148 may be changed on-the-fly to the appropriate stress configuration 140-144 (e.g., low 140, medium 142 or high 144). As the stress level moves below the maximum-allowed stress threshold, the variable configuration data 148 may be changed to the appropriate stress configuration 138-142. On-the-fly switching generally involves reconfiguring the encoder between the end of a just-encoded picture and the start of an about-to-be-encoded picture while active and/or while encoding at runtime.

A purpose of the current stress threshold adjustment 150 may be to avoid instability in the stress estimation. When stress configuration data 140-144 is used as the variable configuration 148, the computational complexity used to encode the current picture may be reduced compared with the normal configuration data 138. The reduced computational complexity may lead to an underestimation of a magnitude of the stress on the circuit 100 caused by encoding the current picture. Applying the underestimation in the following pictures may result in incorrect decisions (e.g., the circuit 100 is underutilized). Therefore, the current stress level threshold adjustment variable 150 may be reduced corresponding to an average savings in the computational complexity caused by using the stress configurations 140-144. Conversely, if the computational complexity is too low, the normal configuration data 138 or the stressed configuration data 140-142 may be used as the variable configuration data 150 to increase the encoding complexity and quality.

The apparatus 90 may apply a delay under certain conditions in the step 128. The delay may further improve the stability of the stress decision before a configuration selection is determined in the step 130. The delay step 128 generally allows immediate (e.g., on-the-fly) switching from lower stress configurations (e.g., 138) to higher stress configurations (e.g., 144). In the opposite direction (e.g., from higher to lower stress configurations), the step 128 may apply a delay to avoid rapid oscillations between two stress levels. In some embodiments, a short (e.g., 0.1 second to 0.5 second) delay may be implemented for the switching from a higher stress configuration to (i) a lower stress configuration or (ii) the normal configuration.

In the step 130, a variable configuration selection function generally copies the selected configuration data 138-144 to the variable configuration block 148. The corresponding stress threshold adjustments (e.g., N, S1, S2 or S3) may be copied to the stress threshold adjustment block 150. For normal video content cases, the normal (e.g., user defined) configuration data 138 may be used. For complex video content, the stress configurations 140-144 may be used. Using the stress configurations 140-144 may have an additional effect of reducing the computational stress on a decoder circuit that decodes the signal OUT. The lower decoding computational complexity generally results in faster decoding operations.

Selection of the configuration data 138-144 generally depends on the processor and computational complexity of the encoder tools. Furthermore, an impact on the output video quality may be considered in the way that stress configurations with (i) minimum quality impact and (ii) the maximum computational savings should be initially utilized. The stress configuration data 140-144 may include, but is not limited to: disabling blocks smaller than 16×16; limiting or disabling sub-pixel motion estimation; disabling 8×8 transform; limiting the motion vector search range; limiting the number of reference frames; and disabling deblock filtering in all or some slices.

Figure 4:
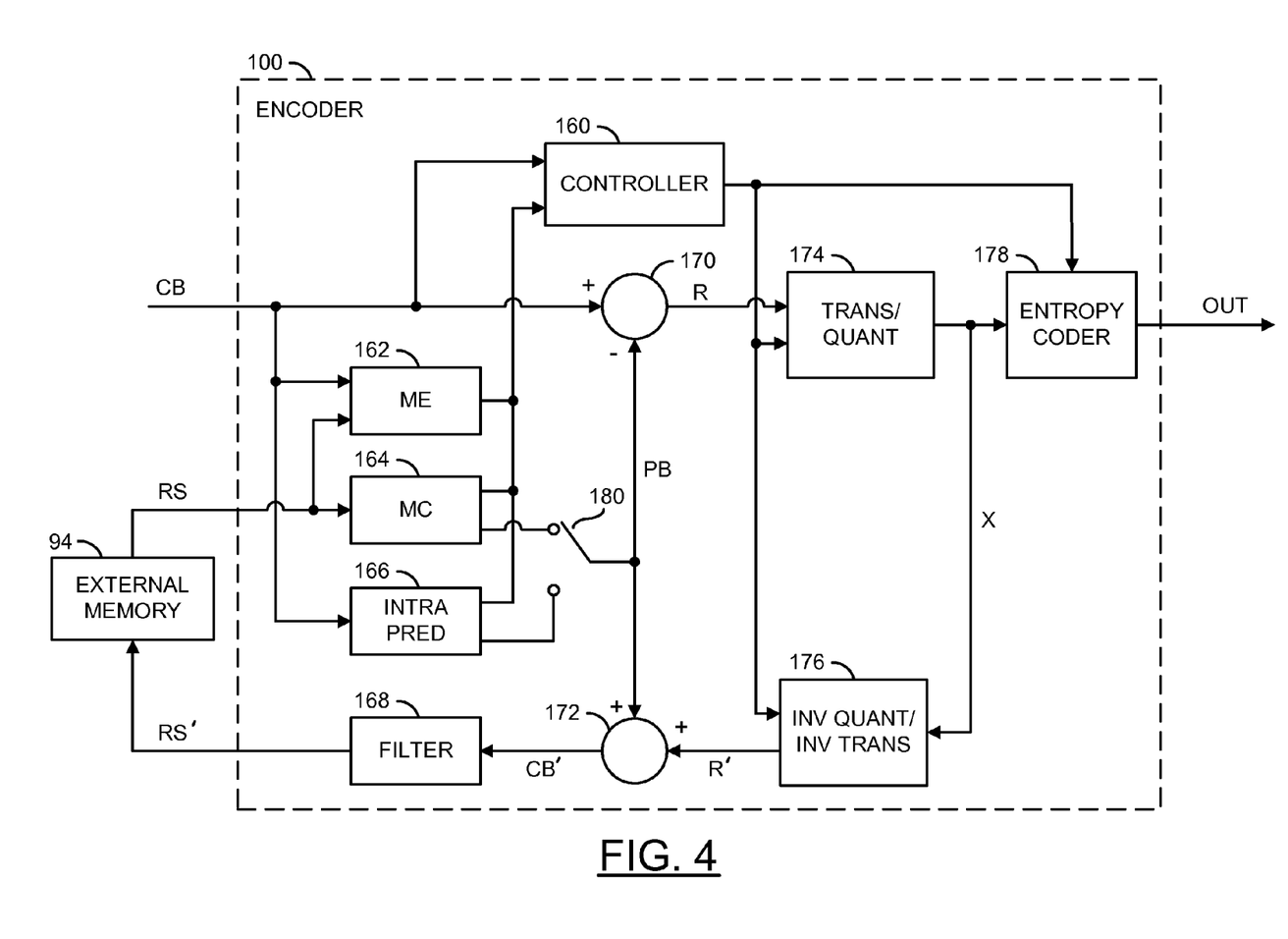
FIG. 4 is a functional block diagram of a video digital signal processor circuit of the apparatus.

Referring to FIG. 4, a functional block diagram of the circuit 100 is shown. The encoder circuit 100 generally comprises a controller step (or function) 160, a motion estimation (e.g., ME) step (or function) 162, a motion compensation (e.g., MC) step (or function) 164, an intra-prediction step (or function) 166, a filter step (or function) 168, an adder step (or function) 170, another adder step (or function) 172, a transform/quantization step (or function) 174, an inverse quantize/inverse transform step (or function) 176, an entropy coder step (or function) 178 and a switch step (or function) 180. The encoder 100 may implement a hybrid video codec. The steps 160-180 may be implemented as hardware, software or a combination of hardware and software.

A signal (e.g., CB) may be received by the controller step 160, the ME step 162, the intra-prediction step 166 and the adder step 170. The signal CB may carry a current block from a current picture in the signal IN. The signal OUT may be generated by the entropy coder step 178. The MC step 164 and the ME step 162 may receive reference picture samples from the memory circuit 94 in a signal (e.g., RS). The filter step 168 may generate and transfer new reference picture samples to the memory circuit 94 in a signal (e.g., RS'). A residual signal (e.g., R) may be generated by the adder step 170 and transferred to the transform/quantization step 174. The signal R may convey residual information produced by subtracting current picture blocks from prediction blocks. The transform/quantization step 174 may generate and transfer a signal (e.g., X) to the entropy coder step 178 and the scale/inverse transform step 176. The signal X may carry the transformed and quantized data representative of the residual blocks. A residual signal (e.g., R') may be generated by the inverse quantize/inverse transform step 176 and presented to the adder step 172. The signal R' may carry reconstructed residual information. A prediction block signal (e.g., PB) may be generated by the MC step 164 or the intra-prediction step 166, depending on the encoding mode. The signal PB generally carries the prediction blocks used by the adder steps 170 and 172. The signal PB may be routed from the step 164 or the step 166 to the adder steps 170 and 172 by the switch step 180. A reconstructed signal (e.g., CB') may be generated by the step 172 and transferred to the step 168. The signal CB' may convey reconstructed blocks, similar to the block received in the signal CB. A reference signal (e.g., RS') may be generated by the step 168 and transferred to the circuit 94. The signal RS' may carry reconstructed reference blocks used to create the reference pictures.

The control step 160 may implement an encoding control function. The step 160 is generally operational to control encoding of the video signal. The video signal generally comprises multiple interlaced fields and/or multiple progressive frames.

The ME step 162 may implement a motion estimation function. The step 162 is generally operational to estimate a motion between a current block of a current picture (or field or frame) and a closest matching block in a reference picture (or field or frame). The estimated motion may be expressed as a motion vector that points from the current block to the closest matching reference block. The reference picture may be earlier or later in time than the current picture. The reference picture may be spaced one or more temporal inter-picture distances from the current picture. Each pixel of a picture may be considered to have a luminance (sometimes called "luma" for short) value (or sample) and two chrominance (sometimes called "chroma" for short) values (or samples). The motion estimation is generally performed using the luminance samples.

The MC step 164 may implement a motion compensation function. The step 164 is generally operational to calculate a motion compensated (or predicted) block based on the reference samples received in the signal RS and a motion vector received from the step 162. Calculation of the motion compensated block generally involves grouping a block of reference samples around the motion vector where the motion vector has integer-pel (or pixel or sample) dimensions. Where the motion vector has sub-pel dimensions, the motion compensation generally involves calculating interpolated reference samples at sub-pel locations between the integer-pel locations. The sub-pel locations may include, but are not limited to, half-pel locations, quarter-pel locations and eighth-pel locations. The motion compensated block may be presented in the signal PB.

The intra-prediction step 166 may implement an interprediction function. The step 166 is generally operational to calculate intra-predicted blocks from other blocks internal to the current picture. The intra-predicted blocks may be presented in the signal PB.

The filter step 168 may implement a spatial filter function. The step 168 is generally operational to spatially filter the reconstructed blocks received in the signal CB'. The filter blocks may be presented as new reference blocks to the circuit 94 in the signal RS'.

The adder step 170 may implement an addition function. The step 170 is generally operational to create residual blocks by adding an inverse of (or subtracting) the motion compensated blocks from the current blocks. The differences may be calculated on a sample-by-sample basis where each sample in a motion compensated block is subtracted from a respective current sample in a current block to calculate a respective residual sample (or element) in a residual block. The residual blocks may be presented in the signal R.

The adder step 172 may implement an adder function. The step 172 may be operational to add the reconstructed residual samples received via the signal R' to the predicted samples received via the signal PB to generate reconstructed current samples. The reconstructed current samples may be presented in the signal CB' to the filter step 168.

The transform step 174 may implement transformation and quantization functions. The step 174 is generally operational to transform the residual samples in the residual blocks into transform coefficients. The step 174 may also be operational to quantize the transform coefficients. The resulting coefficients may be presented in the signal X to the step 178 and the step 176.

The inverse quantization/inverse transform step 176 may implement inverse quantization and inverse transformation functions. The step 176 is generally operational to inverse quantize the coefficients received in the signal X to calculate reconstructed transform coefficients. The step 176 may also be operational to inverse transform the reconstructed transform coefficients to calculate reconstructed residual samples. The step 176 may reverse the quantization and transformation functions performed by the step 174. The reconstructed residual samples may be transferred to the step 172 in the signal R'.

The entropy coder step 178 may implement an entropy encoder function. The step 178 is generally operational to entropy encode a string of reordered symbols and syntax elements that represent the resulting quantized transform coefficients, motion vectors, encoding modes and other data. The encoded information may be presented in the signal OUT.

The switch step 180 may implement a switching function. The step 180 may be operational to route the predicted blocks from the step 166 while the step 160 has selected intraprediction. The step 180 may also be operational to route the motion compensated prediction blocks from the step 164 while the step 160 has selected inter-prediction.

Figure 5:
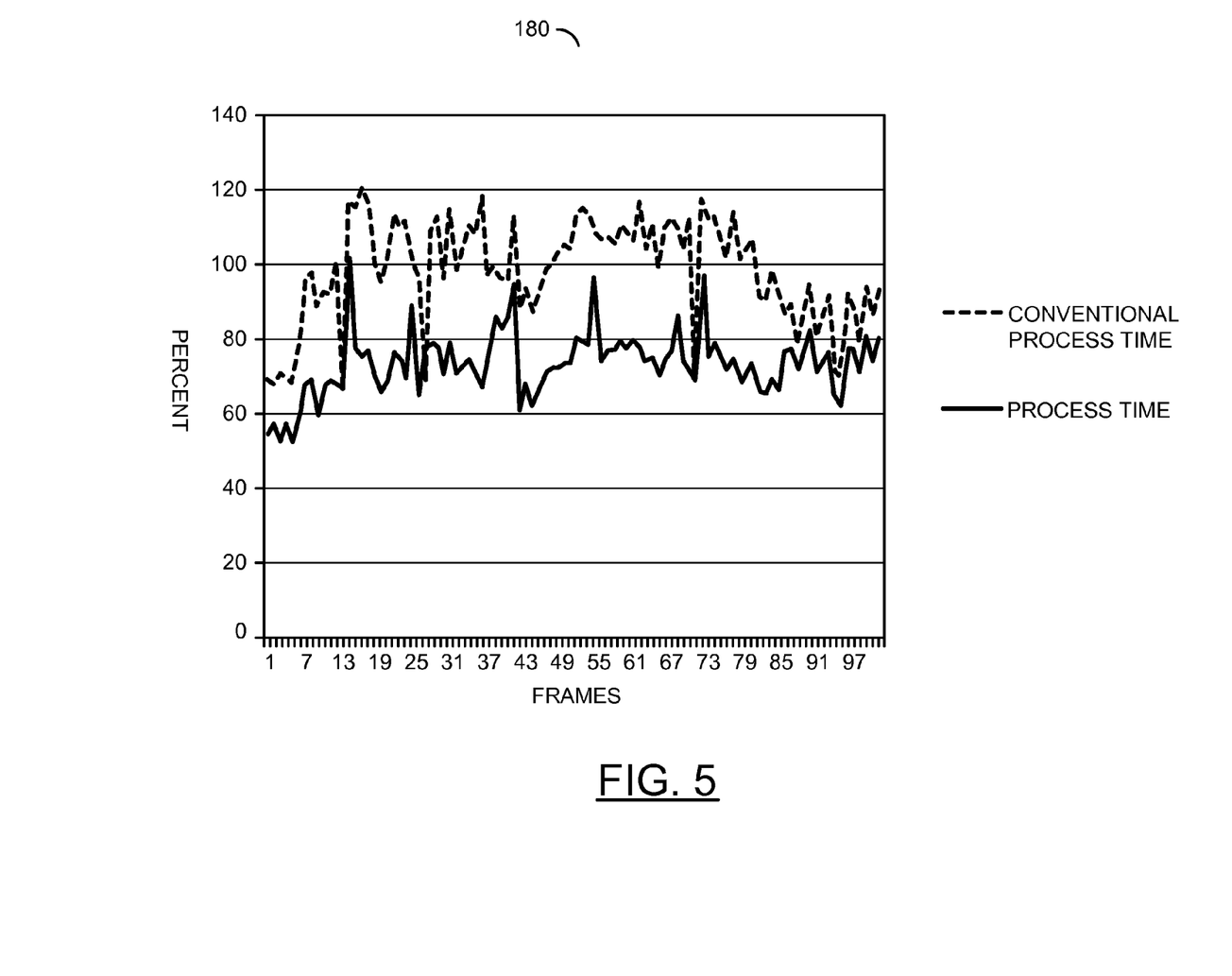
FIG. 5 is a graph of an example processing time comparison for high motion video content.

Referring to FIG. 5, a graph 180 of an example processing time comparison for high motion video content is shown. A top curve illustrates an example percentage of common processing time used to encode the frames. A lower curve illustrates an example percentage of processing time with reconfiguration to account for stress on the encoder. The lower curve generally remains below 100 percent for most frames whereas the upper curve does not. By applying the reconfiguration, an improvement of above 30 percent coding speed for stress video content may be achieved.

Figure 6:
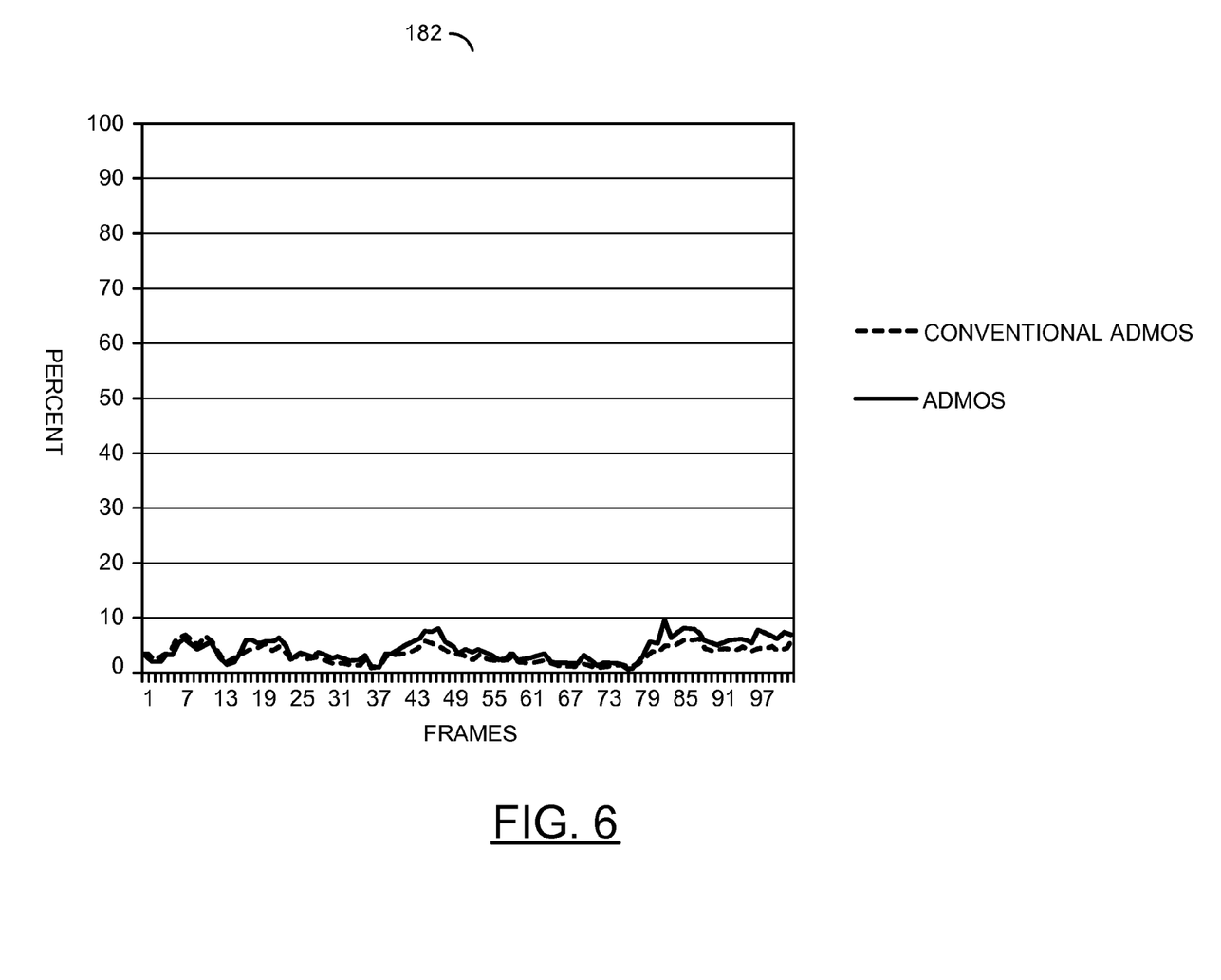
FIG. 6 is a graph of an example subjective quality comparison for high motion video content.

Referring to FIG. 6, a graph 182 of an example subjective quality comparison for high motion video content is shown. The curves may show an attention weighted differential mean opinion score (e.g., ADMOS) with a viewer attention model enabled. A lower value is generally better and values below 20 indicate very good subjective quality. When the encoding is reconfigured to account for stress, the subjective quality remains good and similar when compared with common encoding. Application of the reconfiguration generally affects the video quality in minimal ways with the right selection of coding tools.

The functions performed by the diagrams of FIGS. 2-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a circuit configured to (i) generate a complexity value by encoding a current picture in a video signal, wherein said current picture is encoded using a current one of a plurality of configurations, (ii) calculate an estimate in response to said complexity value and (iii) reconfigure said encoding into a new one of said configurations in response to said estimate relative to one or more thresholds, wherein (a) said configurations comprise a normal configuration and one or more simplified configurations, (b) said estimate describes a computational stress that said encoding of said current picture placed on said circuit and (c) said new configuration is different from said current configuration,
wherein said circuit is further configured to delay said reconfiguration where said new configuration increases a number of tools used in said encoding compared with said current configuration;
wherein said reconfiguration bypasses said delay where said new configuration decreases said number of tools used in said encoding compared with said current configuration.

2. The apparatus according to claim 1, wherein said circuit is further configured to encode a next picture in said video signal using said new configuration.

3. The apparatus according to claim 1, wherein (i) said circuit is further configured to gather a plurality of statistics by said encoding of said current picture, (ii) said statistics characterize how said current picture was encoded and (iii) said complexity value is calculated in response to said statistics.

4. The apparatus according to claim 1, wherein said complexity value is calculated in response to one or more hardware timers.

5. The apparatus according to claim 1, wherein said circuit is further configured to combine said complexity value from each of a plurality of prior pictures to generate said complexity value of said current picture.

6. The apparatus according to claim 1, wherein said circuit is further configured to adjust one of said thresholds corresponding to said new configuration in response to said reconfiguration.

7. The apparatus according to claim 1, wherein said reconfiguration comprises one or more of (i) disabling blocks smaller than 16×16 pixels, (ii) limiting sub-pixel motion estimations, (iv) disabling 8×8 transforms, (v) limiting a motion vector search range, (vi) limiting a number of reference pictures and (vii) disabling a deblock filtering.

8. The apparatus according to claim 1, wherein said apparatus is implemented as one or more integrated circuits.

9. A method for performance control in a video encoding, comprising the steps of:
   (A) generating a complexity value by encoding a current picture in a video signal using a circuit, wherein (i) said current picture is encoded using a current one of a plurality of configurations and (ii) said configurations comprise a normal configuration and one or more simplified configurations;
   (B) calculating an estimate in response to said complexity value, wherein said estimate describes a computational stress that said encoding of said current picture placed on said circuit; and
   (C) reconfiguring said encoding into a new one of said configurations in response to said estimate relative to one or more thresholds, wherein said new configuration is different from said current configuration; and
   (D) delaying said reconfiguration where said new configuration increases a number of tools used in said encoding compared with said current configuration;
   wherein said reconfiguration bypasses said delaying where said new configuration decreases said number of tools used in said encoding compared with said current configuration.

10. The method according to claim 9, further comprising the step of:
   encoding a next picture in said video signal using said new configuration.

11. The method according to claim 9, further comprising the step of:
   gathering a plurality of statistics by said encoding of said current picture, wherein (i) said statistics characterize how said current picture was encoded and (ii) said complexity value is calculated in response to said statistics.

12. The method according to claim 9, wherein said complexity value is calculated in response to one or more hardware timers.

13. The method according to claim 9, further comprising the step of:
   combining said complexity value from each of a plurality of prior pictures to generate said complexity value of said current picture.

14. The method according to claim 9, further comprising the step of:
   adjusting one of said thresholds corresponding to said new configuration in response to said reconfiguration.

15. The method according to claim 9, wherein said reconfiguration comprises one or more of (i) disabling blocks smaller than 16×16 pixels, (ii) limiting sub-pixel motion estimations, (iii) disabling said sub-pixel motion estimations, (iv) disabling 8×8 transforms, (v) limiting a motion vector search range, (vi) limiting a number of reference pictures and (vii) disabling a deblock filtering.

16. An apparatus comprising:
   means for generating a complexity value by encoding a current picture in a video signal, wherein (i) said current picture is encoded using a current one of a plurality of configurations and (ii) said configurations comprise a normal configuration and one or more simplified configurations;
   (B) calculating an estimate in response to said complexity value, wherein said estimate describes a computational stress that said encoding of said current picture placed on said means for generating; and
   (C) reconfiguring said encoding into a new one of said configurations in response to said estimate relative to one or more thresholds, wherein said new configuration is different from said current configuration;
   wherein said circuit is further configured to delay said reconfiguration where said new configuration increases a number of tools used in said encoding compared with said current configuration;
   wherein said reconfiguration bypasses said delay where said new configuration decreases said number of tools used in said encoding compared with said current configuration.

* * * * *